(No Model.)

J. E. PREST.
LOOM TEMPLE.

No. 428,133. Patented May 20, 1890.

WITNESSES
Harry King
INVENTOR
John E. Prest
By F. E. Somes,
Attorney

UNITED STATES PATENT OFFICE.

JOHN E. PREST, OF WHITINSVILLE, MASSACHUSETTS.

LOOM-TEMPLE.

SPECIFICATION forming part of Letters Patent No. 428,133, dated May 20, 1890.

Application filed December 7, 1889. Serial No. 332,921. (No model.)

*To all whom it may concern:*

Be it known that I, JOHN E. PREST, a citizen of the United States of America, residing at Whitinsville, in the town of Northbridge, in the county of Worcester and State of Massachusetts, have invented certain new and useful Improvements in Loom-Temples, of which the following is a specification.

This invention relates to a loom-temple in which the burr-roll is supported on vitreous bearing-surfaces, whereby lubrication is rendered unnecessary and soiling of the cloth is avoided.

The object of the invention is to provide a loom-temple of this character which will be simple and cheap in construction and which will maintain the roll in alignment.

Figure 1:
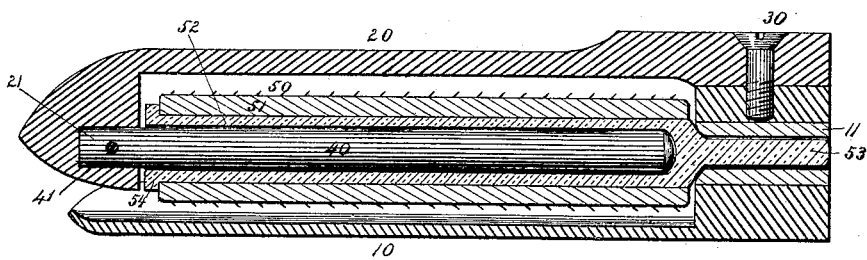
Figure 2:
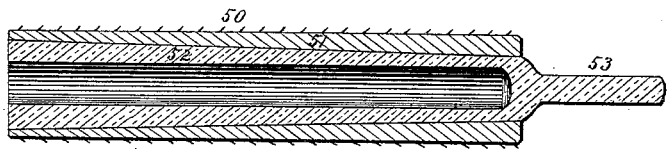
Figure 3:
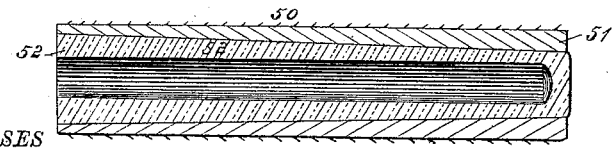

Figure 1 of the accompanying drawings is a longitudinal section of this improved loom-temple in which the bushing of the burr-roll is provided with a cylindrical extension, which enters a guide-socket at the outer end of the temple-case. Fig. 2 is a longitudinal section of a burr-roll and its bushing, in which the bushing is tapered toward its outer end. Fig. 3 is a longitudinal section of the burr-roll, in which the cylindrical extension of the bushing is omitted.

Similar numerals of reference indicate corresponding parts in all the figures.

The case of this improved loom-temple preferably consists of a trough 10 and a cap 20, united by a screw 30. The trough 10 is provided at its outer end with a tubular socket 11, which may be held in place by the screw 30, which unites the cap with the trough. The inner dependent end of the cap is provided with a spindle-seat 21. A spindle 40 is set rigidly into the seat 21 of the cap 30.

The burr-roll 50 comprises an outer shell 51, provided with suitable burrs or teeth for engaging the cloth, and a bushing 52, of glass or other vitreous substance, extending throughout the length of said shell and fixed therein to rotate therewith. This bushing is closed at its outer end and preferably provided with a cylindrical extension 53, which enters the tubular socket 11 in the trough 10. In case the bushing is constructed without the cylindrical extension, as shown in Fig. 3, the tubular socket 11 in the trough 10 is omitted. The inner end of the bushing may be provided with a flange 54, which prevents the shell from sliding off the bushing under the tension of the cloth. The spindle 40 extends through the tubular portion of the bushing, and its free end is rounded and serves as a thrust-bearing for the closed end of the bushing, and the cylindrical extension 53 of the bushing, projecting into its guide-socket 11, assists the spindle in maintaining the burr-roll in proper position and alignment.

Instead of a flange on the bushing, the parts may be held together in any other suitable manner—as, for instance, by a tapering of the bushing and interior of the burr-roll, as shown in Figs. 2 and 3.

I claim—

1. The combination of a temple-case provided with a spindle-seat at one end, a spindle fixed at one end in said seat, and a tubular burr-roll loose on said spindle, said burr-roll having a vitreous bushing extending throughout its length, and said bushing having a closed end integral with its body, which serves as a thrust-bearing for said spindle.

2. The combination of a temple-case provided with a spindle-seat at one end and a guide-socket at the opposite end, a spindle fixed at one end in said seat, and a tubular burr-roll loose on said spindle, said burr-roll having a vitreous bushing throughout its length, provided at one end with a cylindrical extension integral therewith, which projects into said guide-socket.

3. A burr-roll for a loom-temple, comprising an outer shell provided with burrs and an inner vitreous bushing, the interior of the shell and exterior of the bushing being tapered.

JOHN E. PREST.

Witnesses:
F. C. SOMES,
C. A. WEED.